United States Patent
Priese

(10) Patent No.: US 6,679,053 B2
(45) Date of Patent: Jan. 20, 2004

(54) DEVICE FOR PREVENTING UNINTENTIONAL RESTARTING

(75) Inventor: Ronny-Michael Priese, Singen (DE)

(73) Assignee: Georg Fischer Rohrverbindungstechnik GmbH, Singen (DE)

( * ) Notice: Subject to any disclaimer, the term of this patent is extended or adjusted under 35 U.S.C. 154(b) by 11 days.

(21) Appl. No.: 10/173,223

(22) Filed: Jun. 14, 2002

(65) Prior Publication Data

US 2002/0189249 A1 Dec. 19, 2002

(30) Foreign Application Priority Data

Jun. 16, 2001 (DE) .......................... 101 28 354

(51) Int. Cl.$^7$ ............................. F15B 13/042
(52) U.S. Cl. ................ 60/403; 60/406; 137/466
(58) Field of Search .............. 60/399, 403, 406; 137/456, 466, 901

(56) References Cited

U.S. PATENT DOCUMENTS

| | | | | |
|---|---|---|---|---|
| 1,773,775 A | * | 8/1930 | Childs | 137/466 |
| 4,444,091 A | * | 4/1984 | Jorgensen, Jr. | 91/427 |
| 5,007,447 A | | 4/1991 | Penitot et al. | |
| 5,069,421 A | * | 12/1991 | Kishi et al. | 173/170 |
| 6,578,645 B2 | * | 6/2003 | Fahr | 173/170 |

FOREIGN PATENT DOCUMENTS

| | | |
|---|---|---|
| DE | 100 12 419 | 9/2001 |
| EP | 0 822 344 | 2/1998 |
| WO | WO 96/01954 | 1/1996 |

* cited by examiner

*Primary Examiner*—Edward K. Look
*Assistant Examiner*—Thomas E. Lazo
(74) *Attorney, Agent, or Firm*—Bachman & LaPointe, P.C.

(57) ABSTRACT

A device for preventing the unintentional restarting of motors or machines is proposed, it being possible to control the supply of energy to the motor or to the machine by means of a control valve with a mechanically adjustable control element and it being possible to connect the control valve non-detachably to the motor or to the machine, the energy for the motor being generated by means of compressed air, and in that a pneumatic piston, to which the primary air pressure prevailing upstream of the motor and upstream of the control valve can be applied, being arranged as a restarting inhibitor between the control valve and the motor, and in that, in order to apply the primary air pressure, a connecting line being arranged between the motor and the piston.

7 Claims, 3 Drawing Sheets

DEVICE FOR PREVENTING UNINTENTIONAL RESTARTING

BACKGROUND OF THE INVENTION

The invention relates to a device for preventing the unintentional restarting of motors or machines, it being possible to control the supply of energy to the motor or to the machine by means of a control valve with a mechanically adjustable control element and it being possible to connect the control valve non-detachably to the motor or to the machine.

In electrical engineering, restarting preventers are known which prevent machines and/or motors being unintentionally restarted when the power supply is restored after a power failure. The supply of power is continuously interrupted in the event of a power failure and can only be switched on again by releasing or disconnection which is intentionally carried out by the operator.

DE 100 12 419-A discloses a pneumatically acting throttle valve for controlling the energy to a pneumatically operated motor. The throttle valve has a manually activated and rotatable lever for controlling the rate of air flow to the air motor. The throttle valve is non-detachably connected to the motor and to the machine. In order to activate the lever the first time, it must be released with a release latch. Once it is released, the lever will remain in the last position if the air pressure is interrupted. When the air pressure is restored, the motor and the machine can thus restart with the flow of air which was set before the air pressure was interrupted. Particularly with heavy and high-speed machines, it is not possible to rule out a situation in which the operator is placed in danger by the unintentional restarting of the machine.

Taking the prior art as a starting point, the object of the invention is to specify a device for preventing unintentional restarting, which device prevents the operator being placed in danger by the unintentional restarting of the machine, even in the case of pneumatically operated machines.

SUMMARY OF THE INVENTION

The foregoing object is achieved by means of a device for preventing unintentional restarting of motors or machines, it being possible to control the supply of energy to the motor or to the machine by means of a control valve with a mechanically adjustable control element and it being possible to connect the control valve non-detachably to the motor or to the machine, the energy for the motor being generated by means of compressed air, and a pneumatic piston, to which the primary air pressure prevailing upstream of the motor and upstream of the control valve can be applied, being arranged as a restarting inhibitor between the control valve and the motor, and a connecting line being arranged between the motor and the piston in order to apply the primary air pressure.

It is advantageous that the supply of energy to the motor can be controlled in the simplest way possible with an extremely compact device. This is achieved in that the mechanically adjustable control valve is embodied as a throttle valve which is loaded with a spring and operated with the primary pressure.

It is also advantageous that the supply of energy can be regulated as safely as possible and that the supply of energy cannot be switched on unintentionally. This is also achieved by virtue of the fact that the throttle valve has a release latch which has the purpose of releasing the mechanically adjustable control element and which can be activated manually.

It is also advantageous that in an emergency the energy supply can be interrupted in the simplest and most effective way possible. This is achieved in that an emergency shut-off device and a 3/2-way valve are provided in such a way that in an emergency the piston can be forcibly evacuated and can be reactivated again after the emergency only by mechanically releasing the emergency shut-off device.

The basic idea on which the invention is based is that an element which is frequently applied in the electronic control of electrical machines and motors is transferred by analogy to pneumatically driven machines. Locking functions in the air discharge lines of complex pneumatic or hydraulic control methods are known but not in the present simple form in the feed line to an air motor.

BRIEF DESCRIPTION OF THE DRAWINGS

Exemplary embodiments of the invention are described with reference to the figures, of which.

DETAILED DESCRIPTION

Figure 1A:
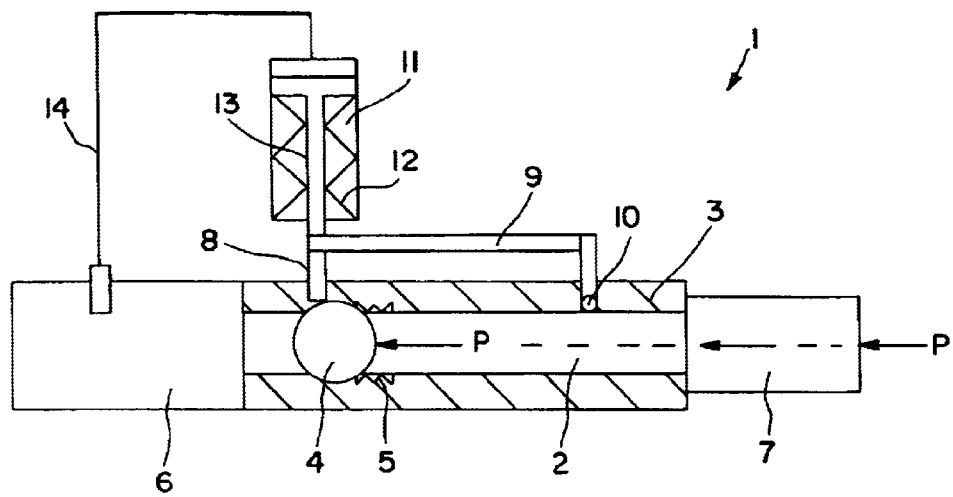
FIGS. 1*a* and 1*b* show a view of a device according to the invention for preventing the unintentional restarting of motors or machines in a non-working and working position, respectively.
Figure 1B:
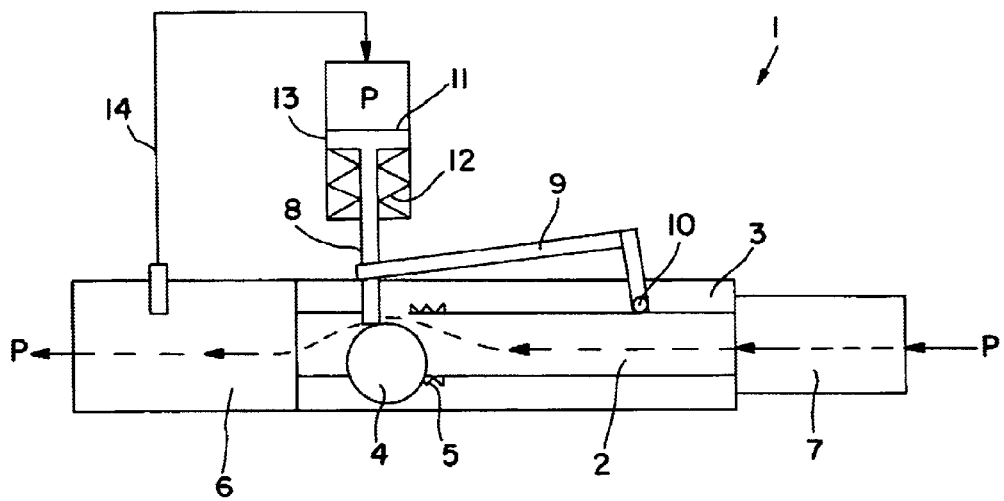

FIGS. 1*a* and 1*b* show the schematic illustration of a device 1 for preventing the unintentional restarting of motors or machines together with a control valve 2, here a throttle valve 2. The throttle valve 2 is composed essentially of a valve housing 3 in which a throttle component, here a ball 4 which is loaded with a spring 5, is arranged. The throttle valve 2 is permanently connected to a motor 6 which is to be driven pneumatically and has a connecting element 7 for a compressed air line P. The ball 4 which is loaded with the spring 5 can be moved in the direction of the main axis of the valve housing 3, counter to the tension of the spring 5. As a result, the quantity of air which can flow out of the compressed air line P through the throttle valve 2 and to the motor 6 is controlled. The ball 4 is moved by a pin 8 which is arranged so that it can move, in a medium-tight fashion, through the wall of the valve housing 3 perpendicular to the main axis of the valve housing 3.

The movement of the pin 8 can be regulated by means of a key track or a ramp which interacts with a handle on the outside of the throttle valve 2 which is not represented here. Before the handle can be activated, a release latch 9 must be activated. The release latch 9 is connected in an articulated fashion at one end to the outside of the valve housing 3, using a screw 10 for example. The release latch 9 can be moved, with the opposite free end, in the direction of the wall of the valve housing 3. In order to be able to operate the throttle valve 2, at least two defined movements which are independent of one another have to be carried out: the articulated movement of the release latch 9 radially with respect to the main axis of the valve housing 3 and the rotational movement of the handle tangentially about the outside of the valve housing 3. In this way, a high degree of safety in the operator control is already achieved.

A pneumatic piston 11 is arranged on the outside of the throttle valve 2. The piston 11 is essentially a single cylinder with relatively small dimensions which acts counter to the force of a restoring spring 12, has compressed air applied to it and can be attached on the outside of the valve housing 3 using simple means, for example with a U-shaped bracket and two screws. The piston 11 has a piston rod 13 which is operatively connected to the release latch 9 and to the pin 8 of the throttle valve 2 or at least interacts with it. The piston 11 is connected to the valve housing 3 in such a way that the movement of the piston rod 13 and the movement of the pin 8 occur in the same direction.

In order to move the piston in the cylinder 11 and the piston rod 13, the primary air pressure, which prevails upstream of the motor 6, is applied to the cylinder. For this purpose, a connecting line 14 is positioned between the motor 6 and the piston 11. If the pressure upstream of the motor 6 is interrupted, the piston 11 is reset by the restoring force of the spring 12 in the initial position which is represented in FIG. 1. The piston rod 13 is moved away from the valve housing 3 and the release latch 9 and the pin 8, which are connected to the piston rod 13, are moved into the initial position. As the air pressure is subsequently built up again, the throttle valve 2 remains closed. The air supply to the motor 6 remains closed until the operator consciously and intentionally reactivates the release latch 9 and the handle in order to activate the pin 8.

If the primary air pressure were to be discontinued, the release latch 9 and the handle would remain in the operating position if the piston 11 were not present. If the air pressure was subsequently built up again, the motor would restart with the same speed as before the failure of the energy supply. The addition of the piston 11, which is installed on the throttle valve 2, and the addition of the connecting line 14 for the primary air pressure between the motor 6 and the piston 11, ensure that the throttle valve 2 remains closed even if the primary air pressure is restored after it has been interrupted. This prevents the hazardous situation of unintentional restarting of the motor 6 and of the machine connected to it.

Figure 2A:
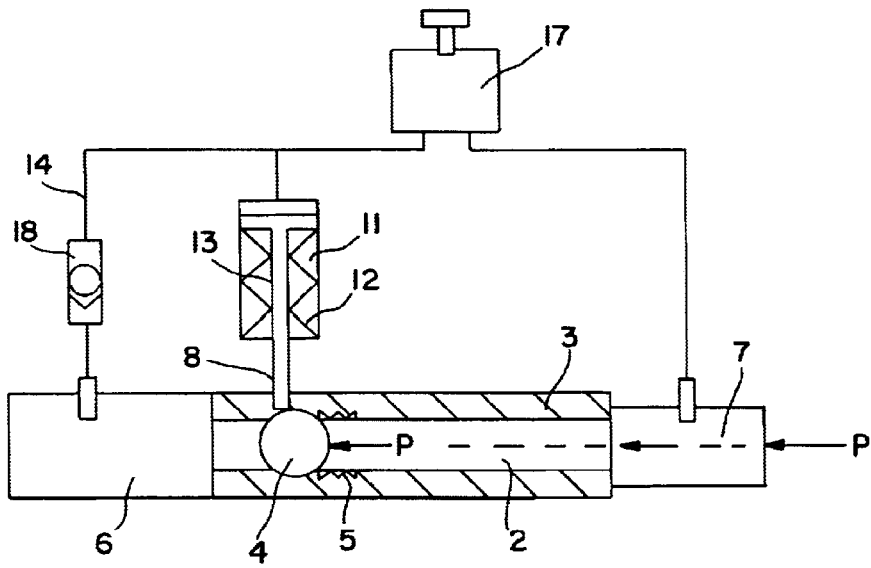
FIGS. 2*a* and 2*b* show a second exemplary embodiment of the invention for preventing the unintentional restarting of motors or machines in a non-working and working position, respectively.
Figure 2B:
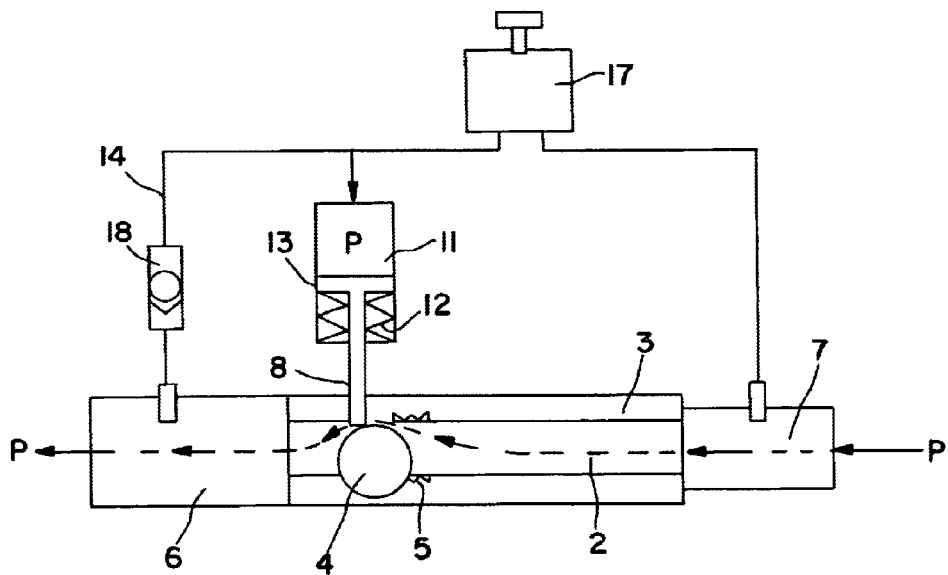
Figure 3:
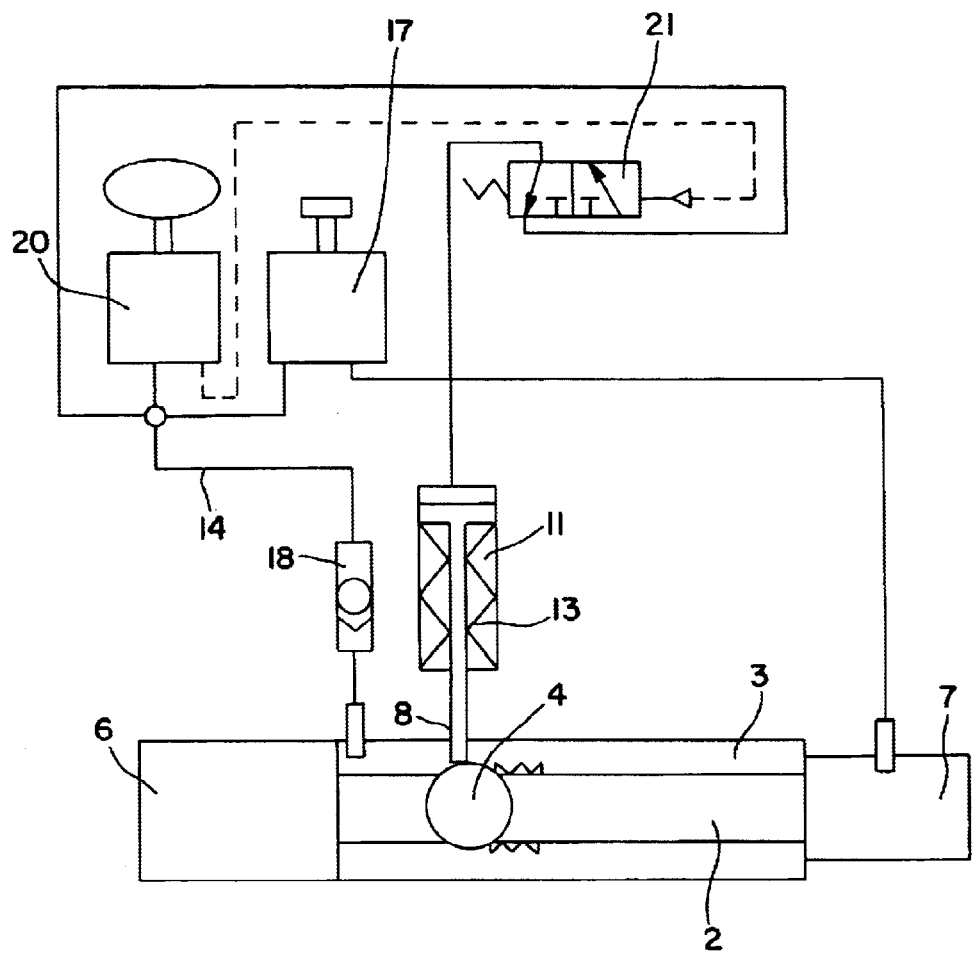
FIG. 3 shows a third exemplary embodiment of the device for preventing the unintentional restarting of motors or machines in a non-working position.

FIGS. 2a and 2b and FIG. 3 show two further exemplary embodiments of the device for preventing the unintentional restarting of motors or machines. FIGS. 2a and 2b illustrate a variant in which the release latch 9 has been omitted. Instead of a mechanical release latch, a pneumatically acting release button 17 is used in FIG. 2. In addition, a non-return valve 18 is arranged in the connecting line 14 between the motor 6 and the release button 17 in such a way that the non-return valve 18 is closed with the releasing of the release button 17, and that the non-return valve 18 can be opened again when the primary air pressure is built up on the motor side of the throttle valve.

FIG. 3 illustrates once more the same arrangement of the throttle valve 2 with the pneumatic piston 11. In the variant in FIG. 3, the device for preventing the unintentional restarting of motors or machines is equipped with an emergency shut-off device 20.

This emergency shut-off device 20 ensures that the piston 11 can be forcibly evacuated in an emergency. In addition to the emergency shut-off device 20, a 3/2-way valve 21 is used so that, when the emergency situation is eliminated, the device can be reactivated only by mechanically releasing the emergency shut-off device 20.

What is claimed is:

1. In combination, a fluid motor and safety means for preventing unintentional restarting of the fluid motor in the event of interruption of the feed of fluid under pressure to the fluid motor comprising:

a fluid motor;

a source of fluid under pressure;

conduit means for feeding fluid under pressure to the fluid motor;

valve means in the conduit means movable between a first position where the flow of fluid under pressure to the fluid motor is blocked and a second position where fluid under pressure is communicated to the fluid motor;

actuating means for moving the valve means from the first position to the second position; and safety means for receiving fluid under pressure for holding the safety means in a first position when said actuating means moves the valve means to the second position, the safety means includes means for biasing the safety means to a second position when the flow of fluid under pressure to the safety means ceases thereby allowing the valve means to move to the first position wherein flow of fluid to the motor is blocked.

2. The combination according to claim 1, wherein the valve means is as a throttle valve which is biased by a spring and the fluid under pressure to the first position.

3. The combination according to claim 2, wherein the actuating means includes a release latch for moving the safety means to the first position wherein the safety means biases the throttle valve to the second position.

4. The combination according to claim 3, wherein the safety means includes a piston with a piston rod wherein the piston rod is connected to the release latch.

5. The combination according to claim 2, wherein the actuating means includes a manually activated and pneumatically acting release button which releases fluid under pressure to the safety means wherein the safety means is moved to the first position for biasing the throttle valve to the second position.

6. The combination according to claim 5, wherein a non-return valve is arranged between the pneumatic release button and the fluid motor in such a way that the non-return valve is closed with the releasing of the release button, and in that the non-return valve is opened again when the fluid under pressure is feed to the fluid motor.

7. The combination according to claim 6, further including an emergency shut-off device and a 3/2-way valve associated with the safety means for removing fluid therefrom.

* * * * *